Patented Apr. 7, 1936

2,036,353

UNITED STATES PATENT OFFICE 2,036,353

PROCESS FOR THE PRODUCTION OF ESTERS

Julius A. Nieuwland and Frank J. Sowa, Notre Dame, Ind., assignors to E. I. du Pont de Nemours & Company, Wilmington, Del., a corporation of Delaware No Drawing. Application October 11, 1934, Serial No. 747,893

19 Claims. (Cl. 260—106)

This invention relates to the formation of esters by reaction of amides with organic hydroxy compounds. More particularly it relates to the formation of esters by the interaction of amides and phenols or alcohols in the presence of boron fluoride.

It is known that boron fluoride forms an amminoboron fluoride, $BF_3NH_3$, with ammonia and that it forms a similar addition compound with amides, $RCONH_2BF_3$.

It is an object of the present invention to prepare esters. It is a further object of the invention to prepare esters by reacting amides with organic hydroxy compounds in the presence of boron fluoride. A still further object is to react alcohols and phenols with amide-boron fluoride addition compounds. Other objects will appear hereinafter.

The objects of this invention are accomplished by passing boron fluoride through the amide, then adding an organic compound containing a hydroxyl group attached to a carbon which in turn is linked by all of its valences to carbon or hydrogen and thereafter refluxing for a short period. The ester is then separated by fractional distillation. The reaction is believed to proceed according to the following equation:

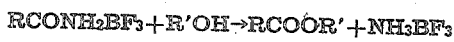
$RCONH_2BF_3 + R'OH \rightarrow RCOOR' + NH_3BF_3$

The following examples serve to illustrate the method by which the invention is carried out. They are not intended, however, to limit the invention.

Example 1

One mole of methyl alcohol is introduced into a 500 cc. flask containing the amide-boron fluoride compound prepared by passing a mole of boron fluoride into a mole of acetamide. The flask is then fitted with a reflux condenser and the mixture refluxed for from 15 to 45 minutes. The ester is then distilled directly from the flask through a fractionating column. Yield 71%.

Example 2

One mole of phenol is introduced into a 500 cc. flask containing the amide-boron fluoride compound prepared by passing a mole of boron fluoride into a mole of acetamide. The flask is then fitted with a reflux condenser and the mixture refluxed for from 15 to 45 minutes. The ester is then distilled directly from the flask through a fractionating column. Yield 50%.

The solid residue remaining after distillation in the above examples was shown by analysis to contain one mole of ammonia. When treated with concentrated sulfuric acid and heated, the residue gave a large amount of boron fluoride gas, which was recovered and re-used in another experiment.

Acetamide was also reacted by the method of Example 1 with the following alcohols; ethyl, isopropyl, n-butyl, and tert-butyl to yield their acetates in the following percentages; respectively, 69%, 32%, 50% and 38%.

By the method described above any amide may be treated with boron fluoride and the addition compound so formed may then be reacted with a compound containing a hydroxyl group attached to a carbon which is linked by all of its valences to carbon or hydrogen, i. e., with any alcohol or phenol. In its broadest scope, therefore, the invention will include the use of any amide together with any alcohol or any phenol, substituted or unsubstituted as starting materials. In addition to the amides mentioned above the following may be mentioned as having been found useful in the process of this invention, formamide, acetamide, propionamide, phenylacetamide, benzamide, chloracetamide, dichloroacetamide and trichloroacetamide. With variations in the amide, the yields vary somewhat, the lowest recorded being 15% and the highest 95% with formamide.

Although the present reaction is generally applicable to amides, it is in some cases seriously interfered with by side reactions. This is particularly true of the heterocyclic amides such as furfuramide. It is, therefore, preferable to use an aromatic or an aliphatic amide, such as those mentioned above.

As the hydroxy compound, any substance may be employed which falls within the scope of the general formula given above. Such hydroxy compounds include mono- and poly-hydroxy alcohols and phenols, whether they be primary, secondary, tertiary, substituted, saturated or unsaturated. In addition to the specific alcohols mentioned above, the following have been found satisfactory, amyl alcohol, ethylene glycol, m-cresol, 1,3,5-xylenol and benzyl alcohol.

Preferably the simpler alcohols and phenols are used, particularly those which consist of a hydrocarbon group to which are attached one or more hydroxyl groups.

As is apparent from the examples, the amide-boron fluoride compound is formed by passing boron fluoride through the amide. In some cases the amminoboron fluoride compound has been observed to separate immediately upon the addition of the hydroxy compound. To obtain good yields, however, it is generally desirable to reflux the reactants for from 15 to 45 minutes. Obviously, however, these limits are not absolute. The refluxing may be dispensed with entirely or continued for a longer period. When the reaction has been completed, the ester is readily separated by fractional distillation.

The precentage yield depends on the amount of boron fluoride used (as long as the latter is not in excess) which seems to indicate that the formation of the monoammino boron fluoride is the driving force. The reactants are preferably brought together in equimolal amounts. Reaction is not prevented, however, by the use of other proportions. A less than molar quantity of boron fluoride based on the amide, decreases the yield. An excess does not affect it. Accordingly the invention is not limited to the use of molal proportions. Wide variations from such proportions are within its scope.

As indicated above a large amount of the boron fluoride used may be recovered after distillation and re-used. Thus the reaction is quite efficient. A wide variety of esters are readily prepared by this process in high yield and in a quite pure state.

It is apparent that many widely different embodiments of this invention may be made without departing from the spirit and scope thereof and, therefore, the invention is not to be limited except as indicated in the appended claims.

We claim:

1. The process which comprises reacting an amide with an organic compound containing a hydroxyl group attached to a carbon which, in turn, is linked by all of its valences to carbon or hydrogen in the presence of boron fluoride.

2. The process which comprises adding boron fluoride to an amide and then reacting the resulting product with an organic compound containing a hydroxyl group attached to a carbon which, in turn, is linked by all of its valences to carbon or hydrogen.

3. The process which comprises adding boron fluoride to an amide and then reacting the resulting product with a member of the group consisting of alcohols and phenols.

4. The process of claim 3 characterized in that substantially equimolal proportions of the amide, the boron fluoride and the hydroxy compound are used.

5. The process of claim 3 characterized in that the amide is a member of the group consisting of aliphatic amides and aromatic amides.

6. The process which comprises reacting an amide-boron fluoride addition compound with a member of the group consisting of alcohols and phenols.

7. The process which comprises adding boron fluoride to an amide, then adding to the resulting composition a member of the group consisting of alcohols and phenols and refluxing the resulting mixture for from 15 to 45 minutes.

8. The process of claim 7 characterized in that substantially equimolal proportions of the boron fluoride and the hydroxy compound are used.

9. The process of claim 7 characterized in that the resulting ester is separated by fractional distillation after the refluxing has been completed.

10. The process of claim 7 characterized in that the resulting ester is separated by fractional distillation after the refluxing has been completed and the residue remaining is acidulated and the boron fluoride recovered.

11. The process which comprises adding boron fluoride to an amide of the group consisting of aliphatic amides and aromatic amides and then reacting the resulting product with a compound of the general formula:

$$ROH$$

in which R is an aromatic or saturated aliphatic radical.

12. The process which comprises adding boron fluoride to acetamide, then adding to the resulting composition a monohydric alcohol, refluxing for from 15 to 45 minutes and separating the resulting ester by fractional distillation.

13. The process of claim 12 characterized in that substantially equimolal proportions of the amide boron fluoride and the hydroxy compound are used.

14. The process which comprises adding boron fluoride to acetamide, then adding to the resulting composition a monohydric phenol, refluxing for from 15 to 45 minutes and separating the resulting ester by fractional distillation.

15. The process of claim 14 characterized in that substantially equimolal proportions of the amide boron fluoride and the hydroxy compound are used.

16. The process which comprises adding boron fluoride to acetamide, then adding to the resulting composition methyl alcohol, refluxing for from 15 to 45 minutes and separating the resulting ester by fractional distillation.

17. The process of claim 16 characterized in that substantially equimolal proportions of the amide boron fluoride and the hydroxy compounds are used.

18. The process which comprises adding boron fluoride to acetamide, then adding to the resulting composition phenol, refluxing for from 15 to 45 minutes and separating the resulting ester by fractional distillation.

19. The process of claim 18 characterized in that substantially equimolal proportions of the amide boron fluoride and the hydroxy compound are used.

JULIUS A. NIEUWLAND.
FRANK J. SOWA.